United States Patent
Salter et al.

(10) Patent No.: US 11,566,672 B1
(45) Date of Patent: Jan. 31, 2023

(54) METHODS AND SYSTEM CONTROLLING A POWER TAKE OFF

(71) Applicant: Ford Global Technologies, LLC, Dearborn, MI (US)

(72) Inventors: Stuart Salter, White Lake, MI (US); Hussein Berry, Dearborn, MI (US); Brian Andonian, Plymouth, MI (US); Richard Boerema, Northville, MI (US); Edwin D. Robertson, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/449,170

(22) Filed: Sep. 28, 2021

(51) Int. Cl.
*F16D 48/06* (2006.01)

(52) U.S. Cl.
CPC ...... *F16D 48/06* (2013.01); *F16D 2500/1023* (2013.01); *F16D 2500/10437* (2013.01); *F16D 2500/30406* (2013.01); *F16D 2500/316* (2013.01); *F16D 2500/70404* (2013.01); *F16D 2500/70408* (2013.01); *F16D 2500/7104* (2013.01)

(58) Field of Classification Search
CPC ............ F16D 48/06; F16D 2500/1023; F16D 2500/10473; F16D 2500/30406; F16D 2500/316; F16D 2500/70404; F16D 2500/70408; F16D 2500/7104; B60W 10/04; B60W 10/06; B60W 10/119; B60W 10/14
See application file for complete search history.

(56) References Cited

U.S. PATENT DOCUMENTS

| | | | |
|---|---|---|---|
| 4,722,426 A | | 2/1988 | Bellanger |
| 5,549,185 A | * | 8/1996 | Kale ...................... B60K 17/28 192/12 C |
| 6,129,187 A | * | 10/2000 | Bellanger ............... B60K 17/28 74/DIG. 7 |
| 6,729,459 B2 | | 5/2004 | Reinards et al. |
| 7,416,068 B2 | | 8/2008 | Ray et al. |
| 8,800,253 B2 | | 8/2014 | Hunt et al. |
| 9,079,493 B2 | | 7/2015 | Pociask et al. |
| 2003/0051969 A1 | * | 3/2003 | Reinards ................ B60K 25/00 192/103 F |
| 2004/0014563 A1 | * | 1/2004 | Janasek ................. B60W 30/19 477/109 |
| 2006/0148616 A1 | | 7/2006 | Ray et al. |
| 2007/0032342 A1 | * | 2/2007 | Meyer ................... B60W 10/30 477/115 |
| 2010/0036569 A1 | * | 2/2010 | Hei ....................... A01D 75/182 701/50 |
| 2018/0187728 A1 | * | 7/2018 | Vora ..................... A01B 71/063 |
| 2020/0408276 A1 | | 12/2020 | Muff et al. |

* cited by examiner

*Primary Examiner* — Edwin A Young
(74) *Attorney, Agent, or Firm* — David Kelley; McCoy Russell LLP

(57) ABSTRACT

Systems and methods for operating a power take off of a vehicle are described. In one example, operation of the power take off may be maintained even when slip of a power take off clutch is detected. In particular, the power take off may be operated at a lower output until the power take off may handle larger loads.

20 Claims, 6 Drawing Sheets

METHODS AND SYSTEM CONTROLLING A POWER TAKE OFF

FIELD

The present description relates to methods and a system for controlling a power take off unit of a vehicle.

BACKGROUND AND SUMMARY

A vehicle may be propelled via one or more torque sources. The vehicle may also include a power take off (PTO) unit that transfers torque from a vehicle driveline to an external mechanical device that may be driven by the one or more torque sources. The power take off may rotate at a desired speed to supply mechanical power to the external mechanical device. The power take off may include gears and a clutch. The gears may change a rotational speed of a vehicle driveline to a speed that may be acceptable for the external mechanical device. In addition, the gears may change an amount of torque that a torque source provides to an external device. However, the PTO may not be able to supply a rated amount of torque at all times. For example, the PTO may supply less than a rated amount of torque when a temperature of the PTO exceeds a threshold temperature. Therefore, the PTO may be stopped to reduce a possibility of PTO degradation. In addition, if the PTO loses efficiency in its ability to transfer torque and/or power, the PTO may be stopped to reduce a possibility of degradation.

The inventors herein have recognized the above-mentioned issues and have developed a method for operating a power take off of a vehicle gearbox, comprising: maintaining or increasing a closing force applied to a clutch of the power take off and reducing torque output of an electric machine in response to slip of the clutch exceeding a threshold.

By maintaining or increasing a closing force that is applied to a power take off clutch and reducing output of an electric machine when the clutch of a power take off slips, it may be possible to avoid power take off degradation while the power take off may continue to deliver mechanical power to a device that is external to a vehicle. For example, if power take off clutch slip and a temperature of the power take off device increase causing the power take off to operate outside of a desired operating range, torque output of an electric machine may be reduced so that power take off clutch slip may be reduced. In addition, a temperature of the power take off device may be reduced after torque output of the electric machine is reduced since the power take off clutch may slip less and because less torque may be transferred by the power take off. The power take off may continue to supply power to an external device even though the power take off device may supply less power to the external device. This may allow the external device to continue to operate while reducing a possibility of power take off degradation.

The present description may provide several advantages. In particular, the approach may reduce a possibility of power take off degradation. Further, the approach may allow devices that are coupled to a power take off to continue to operate. In addition, the approach may allow operators to determine rotational angles of power take off rotation where torque is high so that loads that are coupled to the power take off may be adjusted and aligned to smooth power take off operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
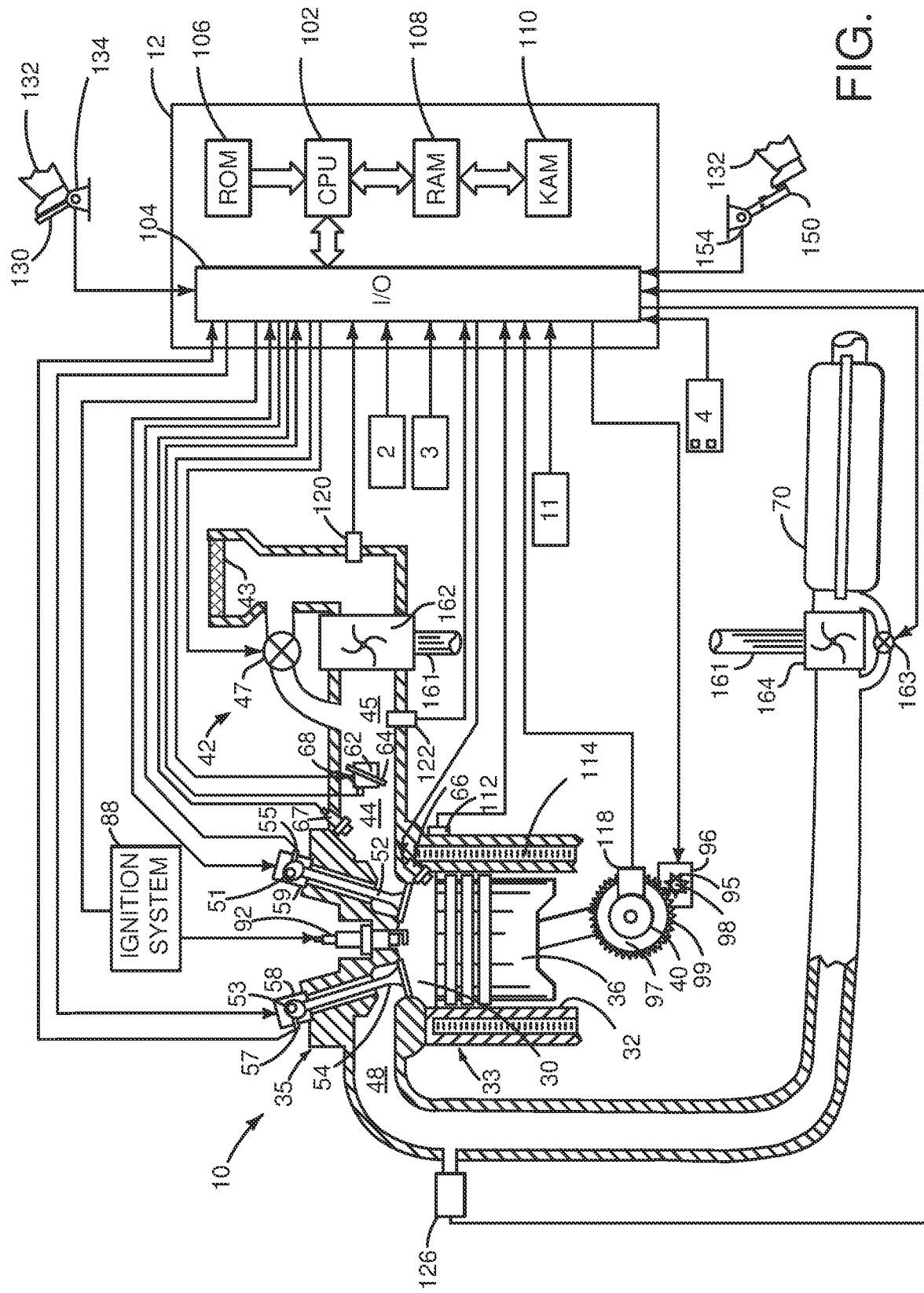
FIG. 1 is a schematic diagram of an engine.
Figure 2:
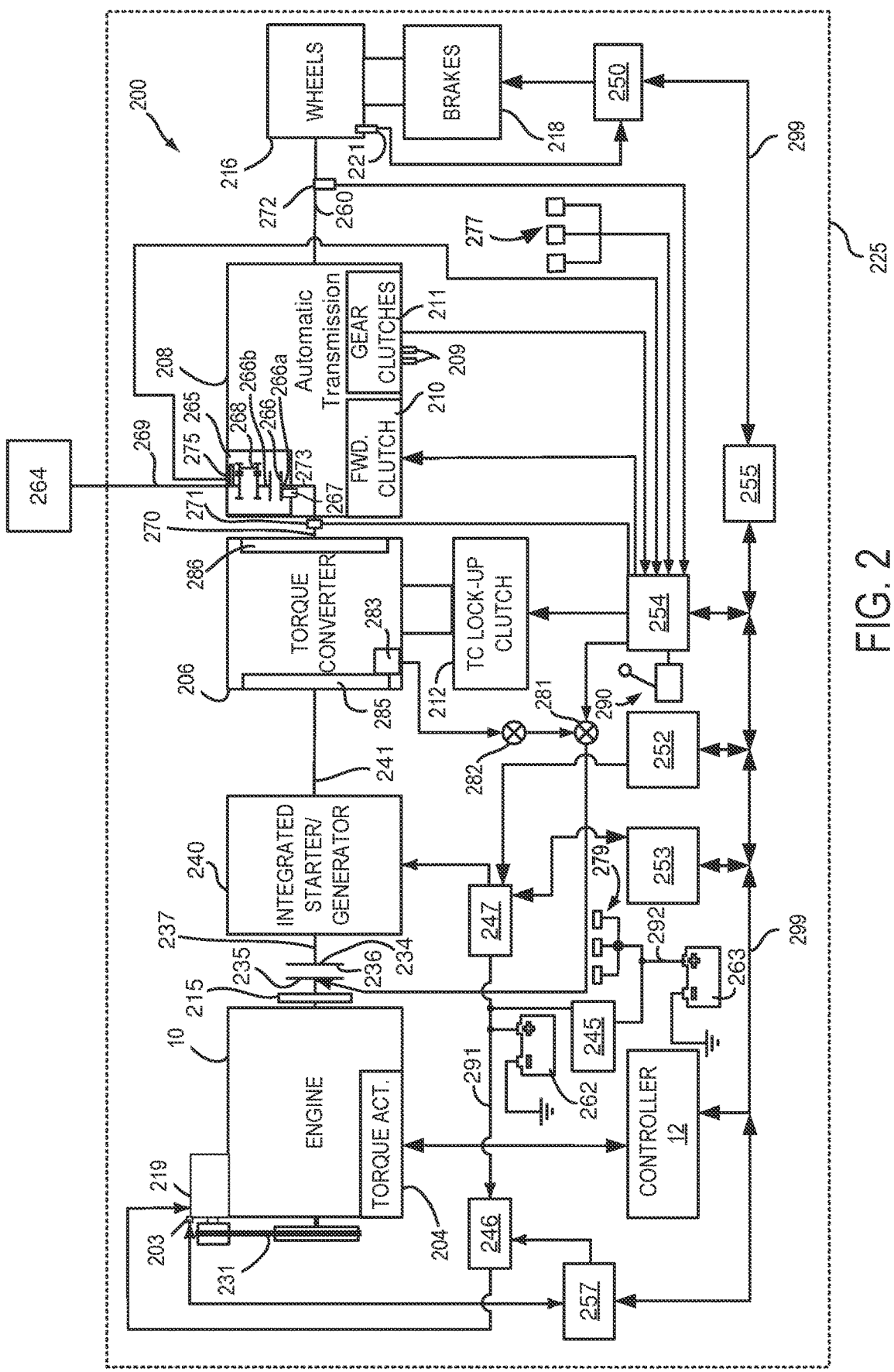
FIG. 2 is a schematic diagram of a first vehicle driveline that includes a power take off.
Figure 3:
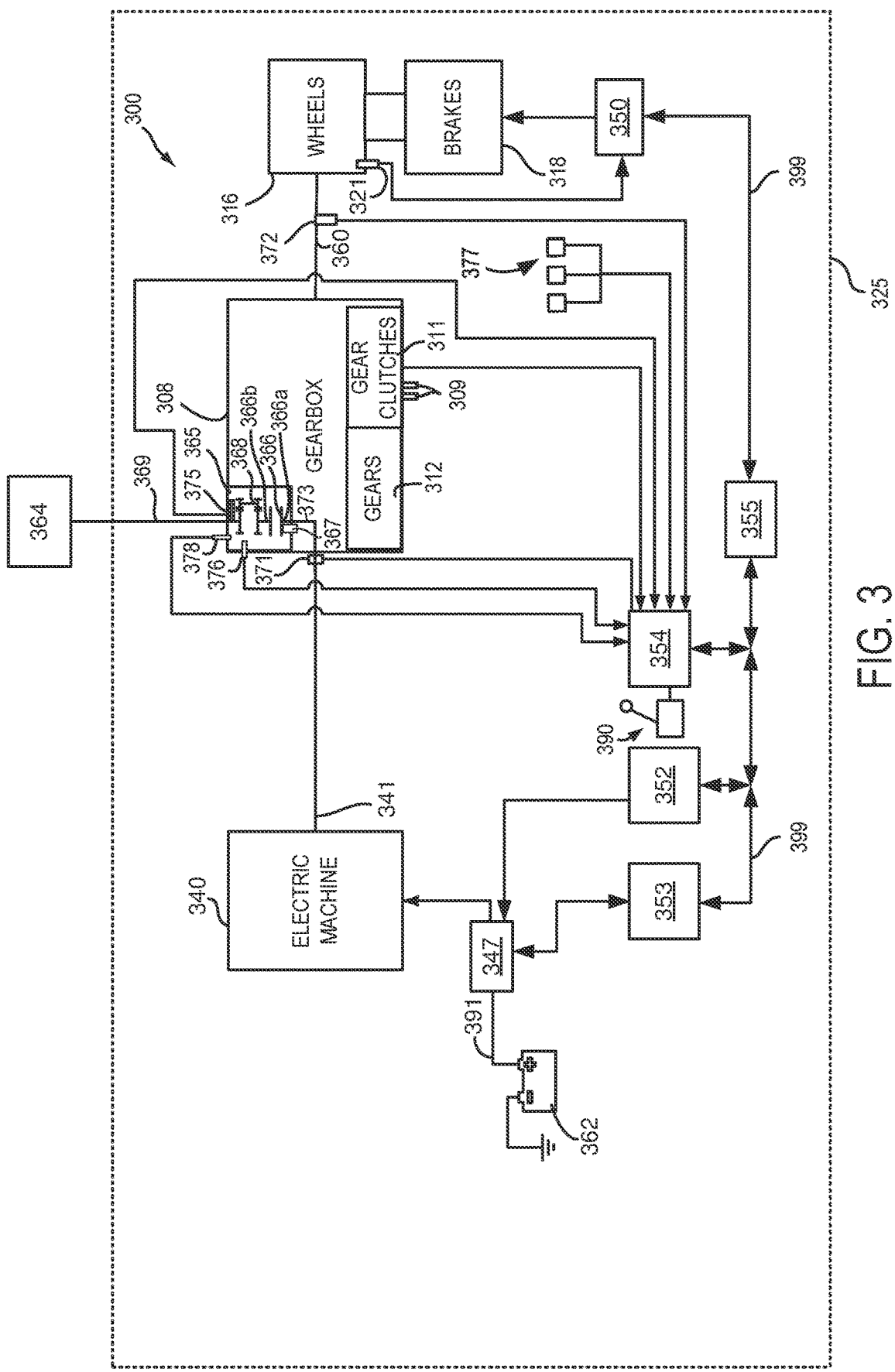
FIG. 3 is a schematic diagram of a second vehicle driveline that includes a power take off.
Figure 4:
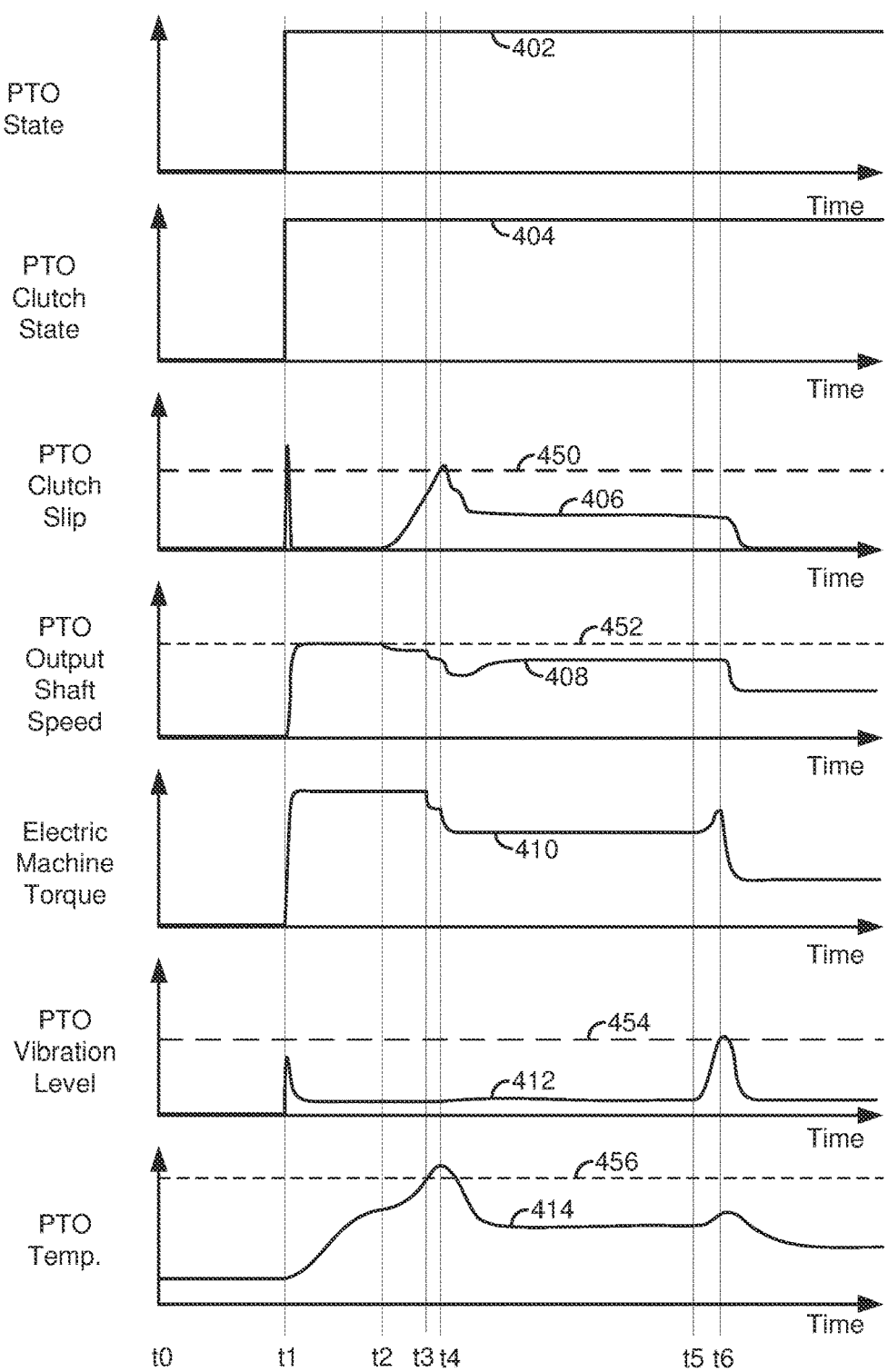
FIG. 4 shows an example power take off operating sequence.
Figure 5:
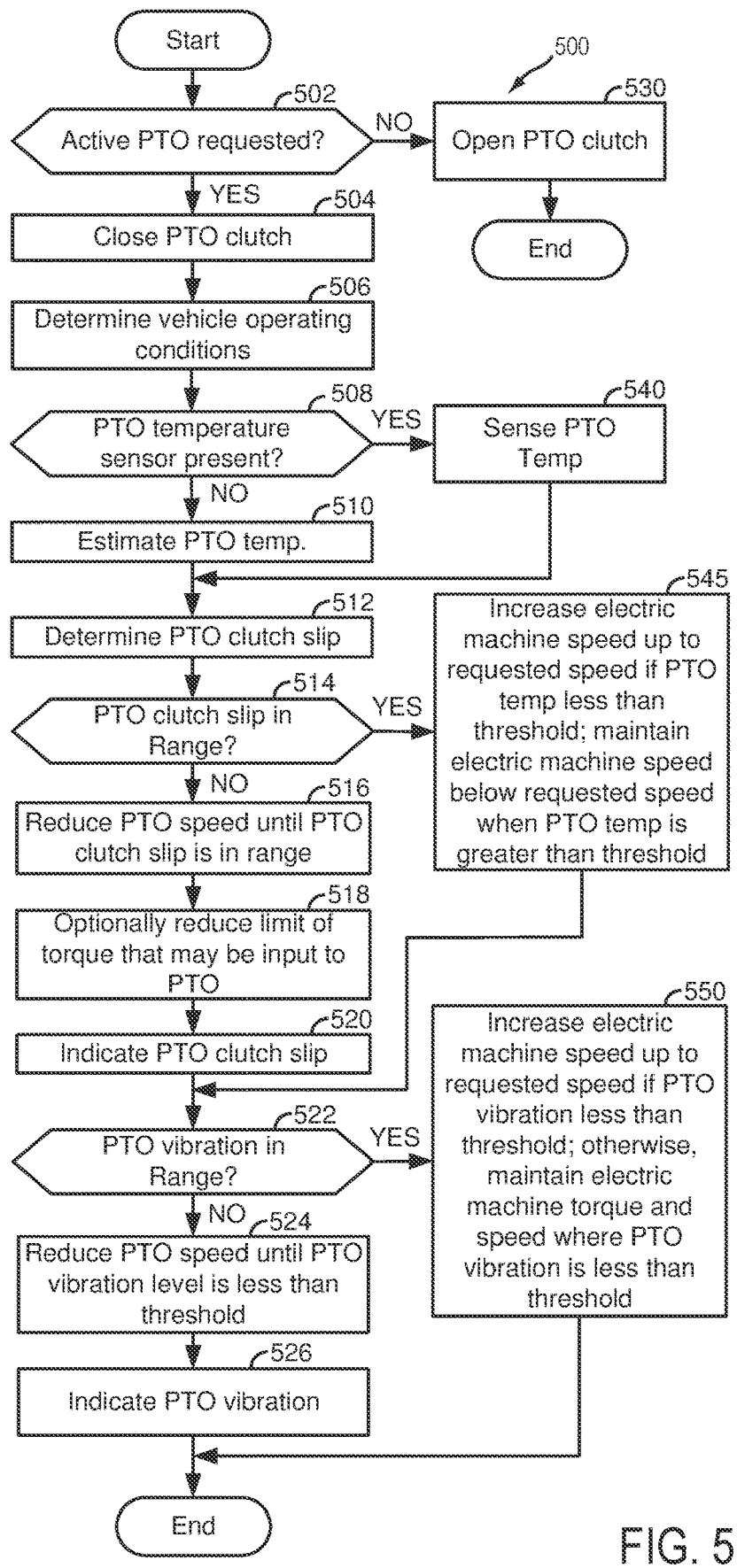
FIG. 5 shows a flow chart of a method for operating a power take off.
Figure 6:
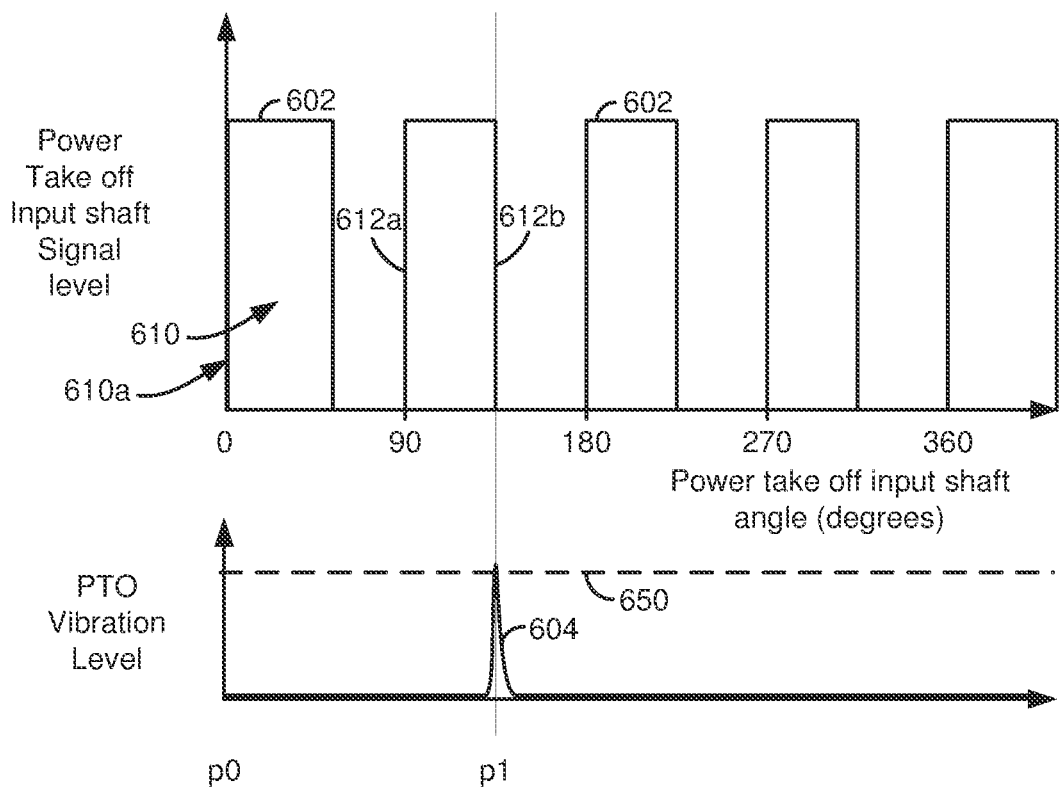
FIG. 6 shows plots of how rotational imbalance of a power take off may be indicated to vehicle operators.
Figure 7:
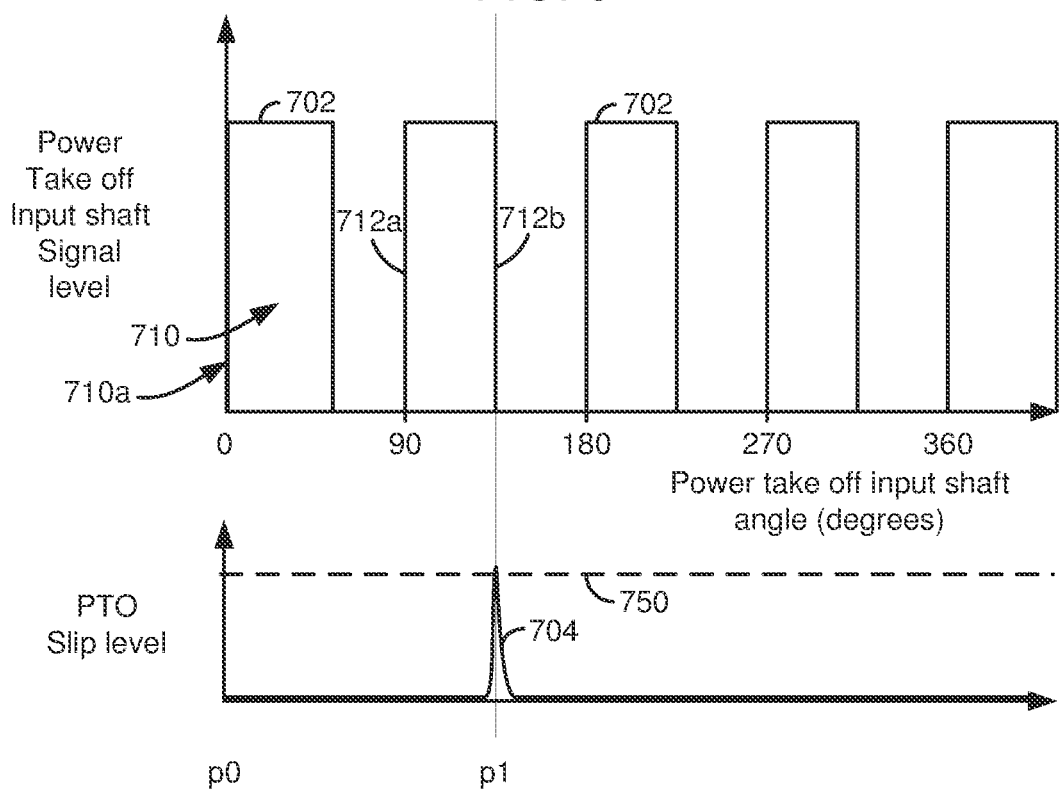
FIG. 7 shows plots of how slip of a power take off clutch may be indicated to vehicle operators.

The present description is related to operating a vehicle that includes a power take off device. The vehicle may include an internal combustion engine as shown in FIG. 1. The internal combustion engine may be part of a hybrid vehicle as shown in FIG. 2. Alternatively, the vehicle may be an electric vehicle that may be propelled solely via an electric machine as shown in FIG. 3. The electric vehicle may also include a power take off device. The hybrid or electric vehicle may operate as shown in FIG. 4 according to the method of FIG. 5. A method for operating a vehicle that includes a power take off is shown in FIG. 5. Rotational imbalances and power take off slip may be identified as shown in FIGS. 6 and 7.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4. A user may select and/or request a vehicle drive mode (e.g., economy, track, highway, hill descent, etc.) via the human machine interface 11.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Automatic transmission 208 also may include a power take off 265 for delivering mechanical power from engine 10 or electric machine 240 to an external mechanically driven device 264 (e.g., a mixing device such as a cement mixer, a generator, etc.). The power take off device 265 may include a clutch 266, clutch actuator 267, and gears 268. The speed of the input side 266a of clutch 266 may be determined via position sensor 271. The speed of the output side 266b of clutch 266 may be determined via positon sensor 275. Alternatively, position sensor 275 may be included in external device 264 and its output data may be transmitted to a controller of vehicle 225. Input shaft 273 delivers torque to the power take off clutch 266. Output shaft 269 may deliver mechanical power from electric machine 240, engine 10, or a combination of electric machine 240 and engine 10 to external device 264 while vehicle wheels 216 are stationary. Gear clutches 211 may be fully open when power take off device 265 is supplying mechanical power to external device 264. Clutch actuator 267 may be electrically or hydraulically operated. For example, clutch actuator 267 may increase a closing force that is applied to clutch 266 when electrical current supplied to clutch actuator 267 is increased. Clutch actuator 267 may decrease a closing force that is applied to clutch 266 when electrical current supplied to clutch actuator 267 is decreased. Electrical current may be supplied to clutch actuator via one of controllers 254 and 255.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, is a block diagram of a vehicle 325 including a powertrain or driveline 300. The powertrain of FIG. 3 includes an electric machine 324 as its sole propulsion source. Powertrain 300 is shown including vehicle system controller 355, electric machine controller 352, gearbox controller 354, energy storage device controller 353, and brake controller 350. The controllers may communicate over controller area network (CAN) 399. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded electric machine, information regarding degraded brakes). Further, the vehicle system controller 355 may provide commands to electric machine controller 352, transmission controller 354, and brake controller 350 to achieve driver input requests and other requests that are based on vehicle operating conditions.

For example, in response to a driver releasing a driver demand pedal and vehicle speed, vehicle system controller 355 may request a desired wheel power or a wheel power level to provide a desired rate of vehicle speed reduction. The requested desired wheel power may be provided by vehicle system controller 355 requesting a first braking power from electric machine controller 352 a desired driveline braking power at vehicle wheels 316. Vehicle system controller 355 may also request a friction braking power via brake controller 350. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 3. For example, a single controller may take the place of vehicle system controller 355, electric machine controller 352, transmission controller 354, and brake controller 350.

In this example, powertrain 300 may be powered by electric machine 240. Driveline electric machine 340 (e.g., high voltage (operated with greater than 30 volts) electrical machine) may also be referred to as a motor, and/or generator. Further, power of electric machine 340 may be adjusted via adjusting operation of inverter 347.

In one example, electric energy storage device 362 may be a higher voltage output device (e.g., 400 volts). High voltage bus 391 is electrically coupled to inverter 347 and higher voltage electric energy storage device 362. Likewise, inverter 347 converts DC power to AC power and vice-versa to enable power to be transferred between electric machine 340 and electric energy storage device 362.

An electric machine output power may be transmitted from electric machine output shaft 341 to gearbox 308. Electric machine 340 may be operated to provide power to powertrain 300 or to convert powertrain power into electrical energy to be stored in electric energy storage device 362 in a regeneration mode. Electric machine 340 is in electrical communication with inverter 347 and inverter 347 is in electrical communication with energy storage device 362. Electric machine 340 is directly mechanically coupled to gearbox 308. Electrical energy storage device 362 may be a battery, capacitor, or inductor. Electric machine 340 may provide a positive power or a negative power to powertrain 300 via operating as a motor or generator as instructed by electric machine controller 352.

Gearbox 308 includes gears 312 and gear clutches (e.g., gears 1-10) 311. Gearbox 308 may be a fixed ratio transmission. The gear clutches 311 and the gears 312 may be selectively engaged to change a ratio of an actual total number of turns of shaft 341 to an actual total number of turns of wheels 316. Gear clutches 311 may be engaged or disengaged via adjusting fluid supplied to the clutches via shift control solenoid valves 309. Power output from the gearbox 308 may also be relayed to wheels 316 to propel the vehicle via output shaft 360. Specifically, gearbox 308 may transfer an input driving power at the shaft 341 responsive to a vehicle traveling condition before transmitting an output driving power to the wheels 316. Transmission controller 354 selectively activates or engages gear clutches 311.

Gearbox 308 also may include a power take off 365 for delivering mechanical power from electric machine 340 to an external mechanically driven device 364 (e.g., a mixing device such as a cement mixer, a generator, etc.). The power take off device 365 may include a clutch 366, clutch actuator 367, and gears 368. The speed of the input side 366a of clutch 366 may be determined via position sensor 371. The speed of the output side 366b of clutch 366 may be determined via positon sensor 375. Alternatively, position sensor 375 may be included in external device 364 and its output data may be transmitted to a controller of vehicle 325. Input shaft 373 delivers torque to the power take off clutch 366. Output shaft 369 may deliver mechanical power from electric machine 340 to external device 364 while vehicle wheels 316 are stationary. Gear clutches 311 may be fully open when power take off device 365 is supplying mechanical power to external device 364. Clutch actuator 367 may be electrically or hydraulically operated. For example, clutch actuator 367 may increase a closing force that is applied to clutch 366 when electrical current supplied to clutch actuator 367 is increased. Clutch actuator 367 may decrease a closing force that is applied to clutch 366 when electrical current supplied to clutch actuator 367 is decreased. Electrical current may be supplied to clutch actuator via one of controllers 354 and 355. Temperature of the power take off may be determined from temperature sensor 376 and vibration of the power take off may be determined via accelerometer 378.

A frictional force may be applied to wheels 316 by engaging friction wheel brakes 318. In one example, friction wheel brakes 318 may be engaged in response to a human driver pressing their foot on a brake pedal (not shown) and/or in response to instructions within brake controller 350. Further, brake controller 350 may apply brakes 318 in response to information and/or requests made by vehicle system controller 355. In the same way, a frictional force may be reduced to wheels 316 by disengaging wheel brakes 318 in response to the human driver releasing their foot from a brake pedal, brake controller instructions, and/or vehicle system controller instructions and/or information. For example, vehicle brakes may apply a frictional force to wheels 316 via controller 350 as part of an automated engine stopping procedure. A braking torque may be determined as a function of brake pedal position.

In response to a request to increase a speed of vehicle 325, vehicle system controller may obtain a driver demand power or power request from a driver demand pedal or other device. Vehicle system controller 355 then commands the electric machine 340 and/or brakes 318 to provide the requested driver demand wheel torque or power. Vehicle system controller 355 requests electric machine power from electric machine controller 352 and electric machine controller 352 commands inverter 347 to provide the requested wheel power or torque compensated for the gear ratios between wheels 316 and electric machine 340. Electric machine 340 delivers the requested power to gearbox 308. Transmission controller 354 selectively engages gears via gear clutches 311 in response to shift schedules that may be based on input shaft power and vehicle speed.

In response to a request to reduce a speed of vehicle 325 and provide regenerative braking, vehicle system controller 355 may provide a negative desired wheel power (e.g., desired or requested powertrain wheel power) based on vehicle speed and brake pedal position. Vehicle system controller 355 then allocates a fraction of the negative desired wheel power to the electric machine 340 and to friction brakes 318. Further, vehicle system controller 355 may notify transmission controller 354 that the vehicle is in regenerative braking mode so that transmission controller 354 shifts gears 311 based on a unique shifting schedule to increase regeneration efficiency. Electric machine 340 may supply a negative power to shaft 341, but negative power provided by electric machine 340 may be limited by transmission controller 354 which outputs a transmission input shaft negative power limit (e.g., not to be exceeded threshold value). Further, negative power of electric machine 340 may be limited (e.g., constrained to less than a threshold negative threshold power) based on operating conditions of electric energy storage device 362, by vehicle system controller 355, or electric machine controller 352. Any portion of desired negative wheel power that may not be provided by electric machine 340 because of transmission or electric machine limits may be allocated to friction brakes 318 so that the desired wheel power is provided by a combination of negative power (e.g., power absorbed) via friction brakes 318 and electric machine 340.

Accordingly, power control of the various powertrain components may be supervised by vehicle system controller 355 with local power control for the transmission 308, electric machine 340, and brakes 318 provided via electric machine controller 352, transmission controller 354, and brake controller 350.

As one example, electric machine controller 2352 may control power output and electrical energy production from electric machine 340 by adjusting current flowing to and from field and/or armature windings of electric machine 340 as is known in the art. Transmission controller 354 receives transmission input shaft position via position sensor 371. Transmission controller 354 may convert transmission input shaft position into input shaft speed via differentiating a signal from position sensor 371 or counting a number of known angular distance pulses over a predetermined time interval. Transmission controller 354 may receive transmission output shaft torque from torque sensor 372. Alternatively, sensor 372 may be a position sensor or torque and position sensors. If sensor 372 is a position sensor, controller 354 may count shaft position pulses over a predetermined time interval to determine transmission output shaft velocity. Transmission controller 354 may also differentiate transmission output shaft velocity to determine transmission output shaft rate of speed change. Transmission controller 354 and vehicle system controller 355, may also receive addition transmission information from sensors 377, which may include but are not limited to pump output line pressure sensors, transmission hydraulic pressure sensors (e.g., gear clutch fluid pressure sensors), electric machine temperature sensors, gear shift lever sensors, and ambient temperature sensors. Transmission controller 354 may also receive requested gear input from gear shift selector 390 (e.g., a human/machine interface device). Gear shift selector 390 may include positions for gears 1-N (where N is an upper gear number), D (drive), and P (park).

Brake controller 350 receives wheel speed information via wheel speed sensor 321 and braking requests from vehicle system controller 355. Brake controller 350 may also receive brake pedal position information from brake pedal sensor 154 shown in FIG. 1 directly or over CAN 399. Brake controller 350 may provide braking responsive to a wheel power command from vehicle system controller 355. Brake controller 350 may also provide anti-lock and vehicle stability braking to improve vehicle braking and stability. As such, brake controller 350 may provide a wheel power limit (e.g., a threshold negative wheel power not to be exceeded) to the vehicle system controller 355 so that negative electric machine power does not cause the wheel power limit to be exceeded.

Thus, the systems of FIGS. 1-3 provide for a system, comprising: a power source; a driveline including a gearbox and a power take off coupled to the gearbox, the power take off including a clutch; and a controller including executable instructions stored in non-transitory memory that cause the controller to maintain or increase a closing force that is applied to the clutch and adjust a torque of the power source in response to a vibration level of the power take off. The system further comprises additional instructions to maintain or increase a closing force that is applied to the clutch and adjust a torque of the power source in response to slip of the clutch exceeding a threshold. The system includes where adjusting the torque of the power source includes decreasing torque output of the power source. The system includes where the power source is an electric machine. The system further comprises additional instructions to reduce the torque of the power source such that the vibration level is reduced to less than a threshold while the power source rotates. The system further comprises additional instructions to indicate the vibration level via a human/machine interface. The system further comprises additional instructions to estimate a temperature of the power take off based on torque and speed of the power take off. The system includes where the power take off supplies mechanical power to a device that is external to a vehicle.

Referring now to FIG. 4, an example prophetic power take off operating sequence is shown. The sequence of FIG. 4 may be provided by the systems of FIGS. 1-3 in cooperation with the method of FIG. 5. The plots of FIG. 4 are time aligned and they begin and end at the same times. The vertical lines t0-t5 represent times of interest in the sequence.

The first plot from the top of FIG. 4 is a plot of power take off (PTO) operating state versus time. The vertical axis represents the power take off operating state and the power take off is activated and it mechanically couples a power source (e.g., an electric machine or engine) to an external device when trace 402 is at a higher level near the vertical axis arrow. The power take off is not activated and decouples the power source from the external device when trace 402 is at a lower level near the horizontal axis. The horizontal axis represents time and time increases from the left side of the plot to the right side of the plot. Trace 402 represents the power take off state.

The second plot from the top of FIG. 4 is a plot of power take off (PTO) clutch state versus time. The vertical axis represents power take of clutch state and the power take off clutch is closed when trace 404 is at a high level near the vertical axis arrow. The power take off clutch is open when trace 404 is at a lower level near the horizontal axis. The horizontal axis represents time and time increases from the left side of the plot to the right side of the plot. Trace 404 represents the power take off clutch state.

The third plot from the top of FIG. 4 is a plot of power take off (PTO) clutch slip amount versus time. The vertical axis represents the power take off clutch slip amount (e.g., a difference in speed between a speed of an input side of the power take off clutch and a speed of an output side of the power take off clutch) and the amount of power take off clutch slip increases in the direction of the vertical axis arrow. The horizontal axis represents time and time increases from the left side of the plot to the right side of the plot. Trace 406 represents the power take of clutch slip amount. The horizontal line 450 represents a power take of clutch slip amount threshold that is not to be exceeded.

The fourth plot from the top of FIG. 4 is a plot of power take off (PTO) output shaft speed versus time. The vertical axis represents the power take off output shaft speed and the power take off output shaft speed increases in the direction of the vertical axis arrow. The horizontal axis represents time and time increases from the left side of the plot to the right side of the plot. Trace 408 represents the power take off output shaft speed. Horizontal line 452 represents a target power take off output shaft speed.

The fifth plot from the top of FIG. 4 is a plot of electric machine torque output versus time. The vertical axis represents the electric machine torque output and the electric machine torque output increases in the direction of the vertical axis arrow. The horizontal axis represents time and time increases from the left side of the plot to the right side of the plot. Trace 410 represents the electric machine torque output. The electric machine is an electric machine that drives the power take off.

The sixth plot from the top of FIG. 4 is a plot of power take off (PTO) vibration level versus time. The vertical axis represents the power take off vibration level and the power take off vibration level increases in the direction of the vertical axis arrow. The horizontal axis represents time and time increases from the left side of the plot to the right side of the plot. Trace 412 represents the power take off vibration level. Horizontal line 454 represents a power take off vibration level that is not to be exceeded.

The seventh plot from the top of FIG. 4 is a plot of power take off (PTO) temperature versus time. The vertical axis represents the power take off temperature and the power take of temperature increases in the direction of the vertical axis arrow. The horizontal axis represents time and time increases from the left side of the plot to the right side of the plot. Trace 414 represents the power take off temperature. Horizontal line 456 represents a power take off temperature threshold that is not to be exceeded.

At time t0, the power take off is not activated and the power take off clutch is open. The power take off clutch slip is zero and the power take off output shaft speed is zero. The electric machine torque is zero and the power take off vibration level is zero. The power take off temperature is equal to ambient temperature.

At time t1, the electric machine is activated and its torque output level is increased. In addition, the power take off clutch is closed activating the power take off. The power take off clutch slip increases to a high level, but it is reduced quickly as the power take off clutch is closed. The power take off output speed increases as the power take off clutch is closed. The power take off vibration level increases quickly, but it is reduced as the power take off clutch is closed. The power take off temperature begins to increase as the electric machine begins to deliver torque to the power take off.

At time t2, the power take off remains activated and the power take off clutch remains closed. A load (not shown) that is applied to the power take off increases and the power take off clutch begins to slip. The power take off output speed is reduced a small amount and the power take off temperature continues to increase. The power take off vibration level is low.

At time t3, the power take off temperature exceeds threshold 456 so torque of the electric machine that drives the power take off is reduced to cool the power take off. The power take off clutch continues to slip while the power take off remains active and while the power take off clutch remains closed. The power take off output speed is reduced since the electric machine torque is reduced. The power take off vibration level remains low.

At time t4, the power take off clutch slip amount exceeds threshold 450 so the torque output of the electric machine is reduced further. The power take off speed is reduced as the electric machine torque is reduced. The power take off vibration level is low and the power take off clutch remains closed. The power take off remains activated and the power take off temperature begins to decline after the electric machine torque is reduced the second time.

Between time t4 and time t5, the power take off remains activated and the power take off clutch remains closed. The power take off clutch slip is reduced to a lower level and the power take off speed is reduced to less than the requested speed 452. The electric machine torque output is at a reduced level and the power take off vibration level is low. The power take off temperature has been reduced to a middle level temperature. In some examples, the electric machine torque may be limited to a reduced level where power take off clutch slip does not occur until the power take off is evaluated or serviced.

At time t5, the power take off vibration level begins to increase. The vibration increase may be due to forces that may be applied to the power take off by an external load or conditions within the power take off. The power take off temperature begins increasing as the power take off vibration level begins to increase. The power take off output speed remains unchanged and the power take off slip amount remains unchanged. The power take off remains activated and the power take off clutch remains closed.

At time t6, the power take off vibration level exceeds threshold 454 so torque output of the electric machine is reduced again. The power take off output shaft speed decreases in response to the decrease in electric machine torque. Further, the power take off clutch slip amount is reduced when the electric machine torque output is reduced. The closing force that is applied to the power take off clutch (not shown) remains constant from time t1 to time t6. The power take of temperature begins to be reduced shortly after time t6 and the power take off device remains activated with its clutch closed.

In this way, output power of an electric machine that is coupled to a power take off may be adjusted to control power take off temperature, clutch slip, and vibration. The power take off device may continue to supply power to an external device so that the external device may remain operational. Thus, the possibility of power take off degradation may be reduced while the power take off device remains operational.

Turning now to FIG. 5, a flowchart of a method for operating a power take off is shown. The method of FIG. 5 may be incorporated into and may cooperate with the systems of FIGS. 1-3. Further, at least portions of the method of FIG. 5 may be incorporated as executable instructions stored in non-transitory memory while other portions of the method may be performed via a controller transforming operating states of devices and actuators in the physical world.

At 502, method 500 determines if activation of the power take off is requested. In some situations, the power take off may only be activated when a vehicle that includes the power take off is engaged in park. These situations may include when the power take is driving a load that is external to the vehicle and when the external load does not move with the vehicle. In other examples, the external load may be external to the vehicle but it may move with the vehicle so that the power take off may rotate when the vehicle is moving. The power take off may be activated when conditions for activating the power take off device are present and when a user indicates that use of the power take off device is requested. The power take off may be requested via a human/machine interface. If method 500 judges that power take off activation is requested, the answer is yes and method 500 proceeds to 504. Otherwise, the answer is no and method 500 proceeds to 530.

At 530, method 500 fully opens the power take off clutch to deactivate the power take off. Opening the power take off clutch may prevent torque from being transferred from a power source of the vehicle to an external load. Method 500 proceeds to exit.

At 504, method 500 closes the power take off clutch and may supply a constant amount of closing force to the power take off clutch via the power take off clutch actuator. The power take off clutch actuator may be electrically or hydraulically operated. Method 500 proceeds to 506.

At 506, method 500 determines vehicle operating conditions. Vehicle operating conditions may be determined via the various sensors described herein or via inference. In one example, method 500 determines an operating state of a power source (e.g., engine or electric machine), vehicle speed, driver demand torque or power, ambient temperature, an amount of power take off slip, and an amount of power take off vibration. Method 500 proceeds to 508.

At 508, method 500 judges whether or not a power take off temperature sensor is present. In one example, method 500 may determine that a power take off temperature sensor is present or is not present according to a value of a variable that is stored in controller memory. If method 500 judges that a power take off temperature sensor is present, the answer is yes and method 500 proceeds to 540. Otherwise, the answer is no and method 500 proceeds to 510.

At 540, method 500 may sense power take off temperature via a temperature sensor. The temperature sensor may sense a housing temperature, a shaft temperature, a bearing temperature, or a temperature of another portion of the power take off device. Method 500 proceeds to 512.

At 510, method 500 estimates the power take off temperature. In one example, method 500 may estimate the power take of temperature via the following equation:

$$PTOtemp = f(PTOtor, PTOn, PTOvib)$$

where PTOtemp is the estimated power take off temperature, f is a function that returns the estimated power take off temperature based on arguments PTOtor, PTOn, and PTOvib, where PTOtor is the amount of torque that is input into the power take off from a vehicle power source, PTOn is the power take off input shaft speed, PTOvib is a power take off vibration amplitude. Values in the function f may be empirically determined via inputting torque into the power take off at different power take off speeds and vibration levels. Method 500 proceeds to 512.

At 512, method 500 determines a present amount of power take off clutch slip. In one example the power take off clutch slip amount may be determined via the following equation:

$$PTOslip = PTOn - PTOon$$

where PTOslip is the power take off slip amount, PTOn is the power take off input shaft speed, and PTOon is the power take off output shaft speed. Method 500 proceeds to 514.

At 514, method determines whether or not the power take off slip amount is within a predetermined power take off slip range (e.g., a desired or requested power take off slip range). The power take off slip range may be a solely a function of power take off operating state, or alternatively, it may be a function of several parameters such as power take off operating state and power take off temperature. In other examples, the power take off slip amount range may be a function of power take off operating state, power take off temperature, and input power to the power take off device. The power take off operating states may include, but are not limited to power take off starting (e.g., beginning when the power take of clutch is commanded closed and ending a predetermined amount of time later), power take off full load (e.g., beginning at the end of the power take off starting period and ending when the power take off clutch is commanded open), and power take off stopping (e.g., beginning when the power take off clutch is commanded open and ending a predetermined amount of time after the power take off clutch is commanded open). For example, in range power take off slip may be 5 revolutions per minute (RPM) or less for conditions when the power take off device is operating at full load conditions. Conversely, in range of power take off slip may be 15 RPM or less during powertrain starting. Increasing levels of vibration may be indicative of higher power take off device temperatures. Thus, the desired or requested slip amount may decrease as power take off vibration levels increase. If method 500 judges that the power take off slip amount is within a specified range, the answer is yes and method 500 proceeds to 545. Otherwise, the answer is no and method 500 proceeds to 516.

At 545, method 500 gradually increases the speed of a power source (e.g., an electric machine or engine) supplying power to the power take off up to a requested or target power take off speed if the temperature of the power take off is less than a threshold temperature. Method 500 maintains the speed of the power source at the target power take off speed if the power take off speed (e.g., input shaft speed) is equal to the target power take off speed and the temperature of the power take off device is less than the threshold temperature. Otherwise, method 500 maintains speed of the power source at a speed that is reduced from the target power take off speed if the power take off temperature is equal to or greater than a threshold temperature. Method 500 may maintain the power source at the reduced speed via reducing a torque output of the power source. If the power source is an electric machine, the torque output of the electric machine may be reduced by reducing electric current that is supplied to the electric machine. The speed of the electric machine may be increased by increasing torque output of the electric machine. Method 500 proceeds to 522.

At 516, method 500 reduces the power take off input shaft speed to a level where the power take off slip amount is within the desired or requested range. Method 500 may reduce the power take off input shaft speed via reducing torque output of a power source. For example, method 500 may reduce the power take off input shaft speed via reducing an amount of electric current that is supplied to an electric machine, thereby reducing torque output of the electric machine. Method 500 may also maintain or increase a closing force that is applied to a power take off clutch when slip is detected.

In some examples, method 500 may also indicate an angular range where the slip level is high. For example, if the power take off slip level peaks at 200 degrees after a reference angle of the power take off input shaft position or of the power take off output shaft position, method 500 indicates that the peak power take off slip level occurs 200 degrees after the reference angle. By reporting the reference angle of the peak slip level, a controller may help power take off operators may identify conditions that may be causing binding of the power take off device. Method 500 proceeds to 518.

At 518, method 500 may optionally reduce a torque limit of the power take off. The torque limit of the power take off may be reduced so that the possibility of higher power take off slip amounts may be reduced. Thus, if the power take off clutch slipped beyond a desired amount when 250 Newton-meters (Nm) was input to the power take off, the power take off may be limited to receive only 200 Nm unless the power take off is serviced or evaluated. Method 500 proceeds to 520.

At 520, method 500 indicates the presence of power take off clutch slip. Method 500 may notify vehicle occupants or power take off operators via a human/machine interface. Method 500 may display the slip amount and suggested actions. Method 500 proceeds to 522.

At 522, method 500 judges if a vibration level of the power take off is within a desired vibration range threshold. The vibration range threshold may be based on vibration amplitude, vibration power level, vibration frequency, vibration velocity, vibration displacement or other known vibration measurement unit. Method 500 may determine the present vibration of the power take off via an accelerometer. If method 500 judges that a present vibration level of the power take off is within a desired vibration range, the answer is yes and method 500 proceeds to 550. Otherwise, the answer is no and method 500 proceeds to 524.

At 550, method 500 gradually increases the speed of a power source (e.g., an electric machine or engine) supplying power to the power take off up to a requested or target power take off speed if the temperature of the power take off is less than a threshold temperature and if the power take off vibration remains within the desired or requested range. Method 500 maintains the speed of the power source at the target power take off speed if the power take off speed (e.g., input shaft speed) is equal to the target power take off speed and the temperature of the power take off device is less than the threshold temperature and if the power take off vibration level is within the desired or requested vibration range. Otherwise, method 500 maintains speed of the power source at a speed that is reduced from the target power take off speed if the power take off vibration level is at the level of the vibration threshold. Method 500 proceeds to exit.

At 524, method 500 reduces the power take off input shaft speed to a level where the power take off vibration amount is within the desired or requested range. Method 500 may reduce the power take off input shaft speed via reducing torque output of a power source. In addition, method 500 may maintain or increase a closing force that is applied to a power take off clutch via a power take off clutch actuator.

In some examples, method 500 may also indicate an angular range where the vibration level is high. For example, if the power take off vibration level peaks at 200 degrees after a reference angle of the power take off input shaft position or of the power take off output shaft position, method 500 indicates that the peak vibration level occurs 200 degrees after the reference angle. By reporting the reference angle of the peak vibration level, a controller may help power take off operators may identify conditions that may be causing the power take off vibrations. Method 500 proceeds to 526.

At 526, method 500 indicates the presence of power take off vibration. Method 500 may notify vehicle occupants or power take off operators via a human/machine interface. Method 500 may display the vibration amount and suggested actions. Method 500 proceeds to exit.

In this way, input to a power take off device may be controlled to reduce a possibility of power take off device degradation while continuing power take off operation. Further, the method may help operators to identify sources of vibration that may be undesirable.

Thus, the method of FIG. 5 provides for a method for operating a power take off of a vehicle gearbox, comprising: maintaining or increasing a closing force applied to a clutch of the power take off and reducing torque output of an electric machine in response to slip of the clutch exceeding a threshold. The method further comprises providing an indication of slip in response to the slip of the clutch exceeding the threshold. The method includes where the indication is provided via a human/machine interface. The method further comprises providing an indication of a rotational angle where the slip of the clutch exceeds the threshold. The method includes where the slip is a speed difference between a first side of the clutch and a second side of the clutch. The method further comprises estimating a temperature of the power take off as a function of power take off torque, speed, and vibration level. The method further comprises determining whether or not the slip of the clutch is in a desired range, where the desired range is a function of the temperature of the power take off.

The method of FIG. 5 also provides for a method for operating a power take off of a vehicle gearbox, comprising: increasing a speed of an electric machine in response to a temperature of a power take off after reducing torque output of the electric machine in response to slip of a clutch of the power take off exceeding a threshold. The method further comprises maintaining or increasing a closing force applied to the clutch. The method further comprises indicating the slip of the clutch via a human/machine interface. The method further comprises providing an indication of increasing the speed of the electric machine before the speed of the electric machine is increased. The method further comprises estimating a temperature of the power take off based on power take off speed and torque.

Referring now to FIG. 6, plots indicating how power take off vibration may be indicated are shown. The first plot from the top of FIG. 6 is a plot of a power take off input shaft position signal that may be output from a position sensor. The vertical axis represents power take off input shaft signal level. The power take off signal level is indicated by trace 602. The power take off signal outputs a high level at predetermined power take off input shaft positions and a low level at other power take off input shaft positions. The horizontal axis represents power take off input shaft angle and the power take off input shaft angle may cover 360 degrees. In this example, the power take off input shaft signal outputs a first pulse 610 that is greater than the other pulse widths of the power take off input shaft signal during one revolution of the power take off input shaft (e.g., 360 degrees). Thus, the first pulse 610 permits the position of the power take off input shaft to be identified. For example, the leading or rising edge 610a of the first pulse indicates that the power take off input shaft is at zero degrees. The rising edge of a second pulse of the power take off input shaft signal is at 90 degrees and a falling edge of the second pulse of the power take off input shaft signal is at 135 degrees.

The second plot from the top of FIG. 6 is a plot of power take off vibration level. The vertical axis of the second plot represents power take off vibration level and the power take off vibration level increases in the direction of the vertical axis arrow. The horizontal axis represents power take off input shaft angle. Trace 604 represents a power take off vibration level. Horizontal line 650 represents a power take off vibration threshold.

At power take off position p1, the vibration level is low. Therefore, the vibration level need not be output. However, at power take off position p2, the vibration exceeds threshold level 650. Method 600 may determine the corresponding power take off angle from the power take off input shaft signal and output a peak vibration position as 135 degrees. The peak vibration level may be output to a human/machine interface.

In this way, a power take off angle where vibrations peak may be identified and indicated to a power take off operator. The identified power take off angle of vibration may be useful for a power take off operator to identify a source of power take off vibration so that the vibration level may be reduced.

Referring now to FIG. 7, plots indicating how power take off slip may be indicated are shown. The first plot from the top of FIG. 6 is a plot of a power take off input shaft position signal that may be output from a position sensor. The vertical axis represents power take off input shaft signal level. The power take off signal level is indicated by trace 702. The power take off signal outputs a high level at predetermined power take off input shaft positions and a low level at other power take off input shaft positions. The horizontal axis represents power take off input shaft angle and the power take off input shaft angle may cover 360 degrees. In this example, the power take off input shaft signal outputs a first pulse 710 that is greater than the other pulse widths of the power take off input shaft signal during one revolution of the power take off input shaft (e.g., 360 degrees). Thus, the first pulse 710 permits the position of the power take off input shaft to be identified. For example, the leading or rising edge 710a of the first pulse indicates that the power take off input shaft is at zero degrees. The rising edge of a second pulse of the power take off input shaft signal is at 90 degrees and a falling edge of the second pulse of the power take off input shaft signal is at 135 degrees.

The second plot from the top of FIG. 7 is a plot of power take off slip level. The vertical axis of the second plot represents power take off slip level and the power take off slip level increases in the direction of the vertical axis arrow. The horizontal axis represents power take off input shaft angle. Trace 704 represents a power take off slip level. Horizontal line 750 represents a power take off slip threshold.

At power take off position p1, the power take off slip level is low. Therefore, the slip level need not be output to a human/machine interface. However, at power take off position p2, the power take of slip level exceeds threshold level 750. Method 500 may determine the corresponding power take off angle from the power take off input shaft signal and output a peak power take off angular position of 135 degrees. The peak power take off level may be output to a human/machine interface.

In this way, a power take off angle where slip peaks may be identified and indicated to a power take off operator. The identified power take off angle of slip may be useful for a power take off operator to identify angular positions where higher torque amounts may be applied to the power take off output shaft so that a possibility of binding of the power take off may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating a power take off of a vehicle gearbox, comprising:
   maintaining or increasing a closing force applied to a clutch of the power take off and reducing torque output of an electric machine in response to slip of the clutch exceeding a threshold.

2. The method of claim 1, further comprising providing an indication of slip in response to the slip of the clutch exceeding the threshold.

3. The method of claim 2, where the indication is provided via a human/machine interface.

4. The method of claim 1, further comprising providing an indication of a rotational angle where the slip of the clutch exceeds the threshold.

5. The method of claim 1, where the slip is a speed difference between a first side of the clutch and a second side of the clutch.

6. The method of claim 1, further comprising estimating a temperature of the power take off as a function of power take off torque, speed, and vibration level.

7. The method of claim 6, further comprising determining whether or not the slip of the clutch is in a desired range, where the desired range is a function of the temperature of the power take off.

8. A system, comprising:
   a power source;
   a driveline including a gearbox and a power take off coupled to the gearbox, the power take off including a clutch; and
   a controller including executable instructions stored in non-transitory memory that cause the controller to maintain or increase a closing force that is applied to the clutch and adjust a torque of the power source in response to a vibration level of the power take off.

9. The system of claim 8, further comprising additional instructions to maintain or increase a closing force that is applied to the clutch and adjust a torque of the power source in response to slip of the clutch exceeding a threshold.

10. The system of claim 8, where adjusting the torque of the power source includes decreasing torque output of the power source.

11. The system of claim 10, where the power source is an electric machine.

12. The system of claim 8, further comprising additional instructions to reduce the torque of the power source such that the vibration level is reduced to less than a threshold while the power source rotates.

13. The system of claim 12, further comprising additional instructions to indicate the vibration level via a human/machine interface.

14. The system of claim 8, further comprising additional instructions to estimate a temperature of the power take off based on torque and speed of the power take off.

15. The system of claim 8, where the power take off supplies mechanical power to a device that is external to a vehicle.

16. A method for operating a power take off of a vehicle gearbox, comprising:
   increasing a speed of an electric machine in response to a temperature of a power take off after reducing torque output of the electric machine in response to slip of a clutch of the power take off exceeding a threshold.

17. The method of claim 16, further comprising maintaining or increasing a closing force applied to the clutch.

18. The method of claim 16, further comprising indicating the slip of the clutch via a human/machine interface.

19. The method of claim 18, further comprising providing an indication of increasing the speed of the electric machine before the speed of the electric machine is increased.

20. The method of claim 16, further comprising estimating a temperature of the power take off based on power take off speed and torque.

* * * * *